United States Patent [19]

Durkin et al.

[11] Patent Number: 5,675,604
[45] Date of Patent: Oct. 7, 1997

[54] PORTABLE PUMPED LASER SYSTEM

[75] Inventors: Peter S. Durkin; Stephen G. Post, both of Albuquerque, N. Mex.

[73] Assignee: The United States of America as represented by the Secretary of the Air Force, Washington, D.C.

[21] Appl. No.: 385,002

[22] Filed: Feb. 7, 1995

[51] Int. Cl.⁶ .................. H01S 3/091; H01S 3/094
[52] U.S. Cl. .................. 372/75; 372/22; 372/34; 372/93
[58] Field of Search .................. 372/12, 22, 41, 372/71, 75, 93, 34

[56] References Cited

U.S. PATENT DOCUMENTS

| | | | |
|---|---|---|---|
| 4,127,827 | 11/1978 | Barry | 372/93 |
| 4,635,263 | 1/1987 | Mollenauer | 372/93 |
| 5,022,043 | 6/1991 | Jacobs | 372/71 |
| 5,226,903 | 7/1993 | Mizuno | 606/17 |
| 5,249,196 | 9/1993 | Scheps | 372/93 |
| 5,263,038 | 11/1993 | Lukas et al. | 372/22 |
| 5,300,063 | 4/1994 | Tano et al. | 606/4 |
| 5,311,224 | 5/1994 | Enomoto | 351/214 |
| 5,318,560 | 6/1994 | Blount et al. | 606/4 |
| 5,341,388 | 8/1994 | Masuda et al. | 372/34 |
| 5,345,454 | 9/1994 | Keller | 372/12 |
| 5,454,002 | 9/1995 | McCann | 372/34 |

*Primary Examiner*—Rodney B. Bovernick
*Assistant Examiner*—Robert E. Wise
*Attorney, Agent, or Firm*—Thomas C. Stover

[57] ABSTRACT

The invention provides a portable compact laser system that emits a frequency-doubled green laser beam, which system is thermoelectrically cooled in air and has a power output of up to 1 watt or more. The portable laser system of the invention includes a diode-pumped laser crystal, which emits light into a folded resonator cavity defined by such crystal, a turning mirror and an end mirror, with preferably an SHG crystal between the mirrors, for frequency-doubling IR light to green light and outcoupling the latter through the turning mirror. Such laser system packages into a volume of less than 1 cubic foot, uses solid state cooling technology and requires only single phase, 115 VAC prime power. The portable laser of the invention is small enough and light enough to be hand-carried aboard commercial aircraft by, eg. an eye surgeon and powerful enough to be used in eye surgery.

12 Claims, 2 Drawing Sheets

PORTABLE PUMPED LASER SYSTEM

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a compact laser system, particularly a portable pumped laser system.

2. The Prior Art

Lasers are finding increasing commercial application including in the Doctor's Office. In one example, ophthalmologist use green laser beams in eye surgery. For this purpose, high-power green radiation is required.

In the prior art a laser that is capable of delivering high power green radiation is the Argon Ion Laser. It is a gas laser that is quite large, heavy and inefficient. It requires a large (separate) power supply, 220 VAC power and is water cooled.

Thus such prior art systems are usually water-cooled and too bulky or heavy to be readily portable. See for example, U.S. Pat. No. 5,300,063 to Tano et al. (1994).

Accordingly there is need and market for a portable laser system that overcomes the above prior art shortcomings.

Accordingly it is an object of this invention to provide a laser system that is sufficiently compact and lightweight to be readily portable.

SUMMARY OF THE INVENTION

Broadly the present invention provides a laser system that is powerful and yet readily portable. Such system has:

a) a rare earth doped laser rod crystal, b) a pump light source to pump the crystal and emit a laser beam and c) a folded resonator cavity.

The resonator cavity has 1) the above rod crystal at one end, 2) a turning mirror spaced therefrom to define the first leg of the resonator cavity and 3) an end reflector spaced from the turning mirror, to define the second or folded leg of the resonator cavity, so as to resonate the laser beam in the first and second legs and to outcouple a portion of the beam through the turning mirror.

That is per the above invention, the resonator cavity is folded so as to define a first leg of the cavity between the above rod crystal and a turning mirror spaced therefrom and the second leg of the cavity is defined by the turning mirror and a reflector spaced therefrom, so as to resonate the laser beam between crystal, turning mirror and reflector and to outcouple a portion of the laser beam through the turning mirror.

In another embodiment of the invention, an SHG crystal can be mounted in the second leg of the resonator cavity, to double the frequency of at least a portion of the laser beam for outcoupling thereof through the turning mirror.

Desirably, the above embodiments of the invention are air-cooled by thermoelectric means to provide a compact, portable, lightweight laser system as further described below.

BRIEF DESCRIPTION OF THE DRAWINGS

The invention will become more apparent from the following detailed specification and drawings in which.

DESCRIPTION OF PREFERRED EMBODIMENTS

Figure 1:
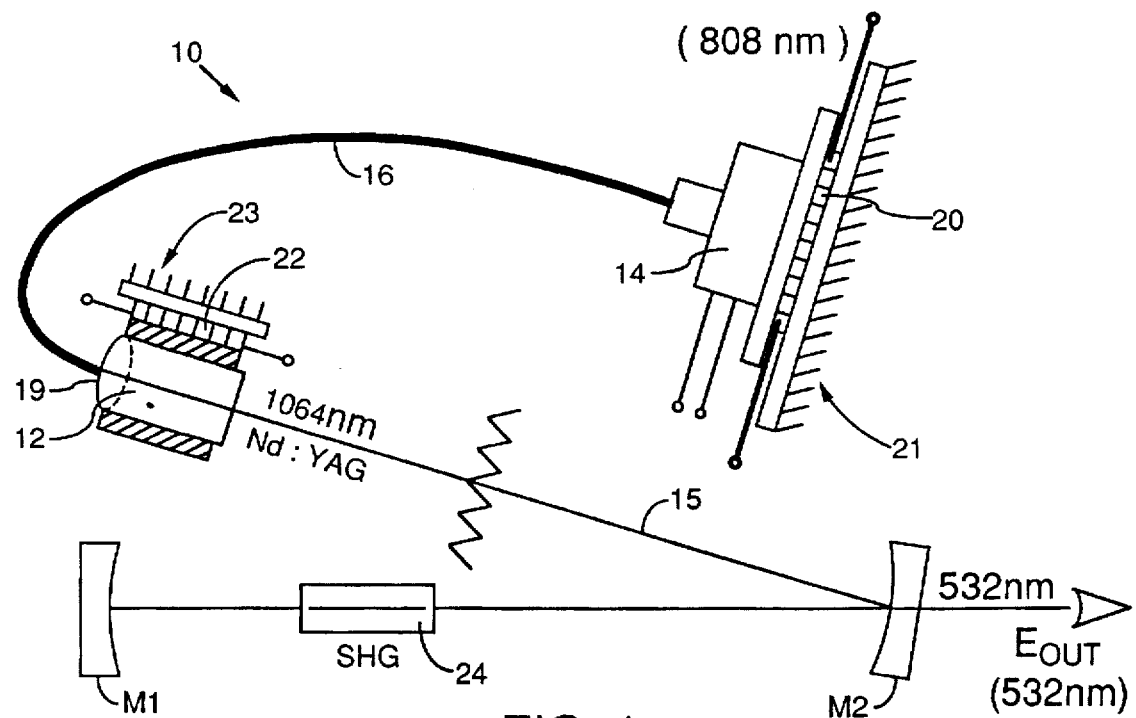
FIG. 1 is a folded resonator embodiment of the portable pumped laser system of the invention.

Referring in more detail to the drawings, FIG. 1 displays a folded, frequency-doubled, solid-state laser system 10 in which a rare earth doped laser rod crystal 12 is installed in the laser resonator as amplification media and resonator mirror. It is pumped by laser diode (array) 14 which emits a light beam at 808 nm, through a fiber optic cable 16 to the end input surface 19 of the crystal 12. The crystal 12, as appropriate for the arrangement, possesses a suitable radius of curvature and is coated on the pump light input coupling side to be highly reflecting (HR) for the fundamental frequency (FF) and anti-reflecting (AR) coated for the 808 nm pump light. Thus the solid-state laser has a high-power, fiber-coupled, semiconductor laser diode 14 which end-pumps the rod crystal 12. The crystal is additionally AR coated on the opposite side for the FF.

Per FIG. 1, the resonator cavity also has a turning mirror M2 and an end mirror M1 to define two legs of a folded resonator cavity. That is, a first leg between the crystal 12 and the turning mirror M2 and the second leg between the turning mirror M2 and the end mirror M1.

The turning mirror M2 is HR coated for the FF (IR) and possesses a highly transmissive coating (HT) for the second harmonic (SH) to allow outcoupling of green light. The end mirror M1 is HR coated for the FF and SH. An SHG crystal 24 is placed in the folded section of the resonator cavity between M1 and M2 and has the appropriate coatings. As further shown in the example of FIG. 1, the diode 14 emits pump light at 808 nm to the crystal 12 which emits IR light at 1064 nm, which light passes into the folded resonator cavity and through the SHG crystal 24 and is outcoupled through turning mirror M2 as a green laser beam at 532 nm.

Figure 2:
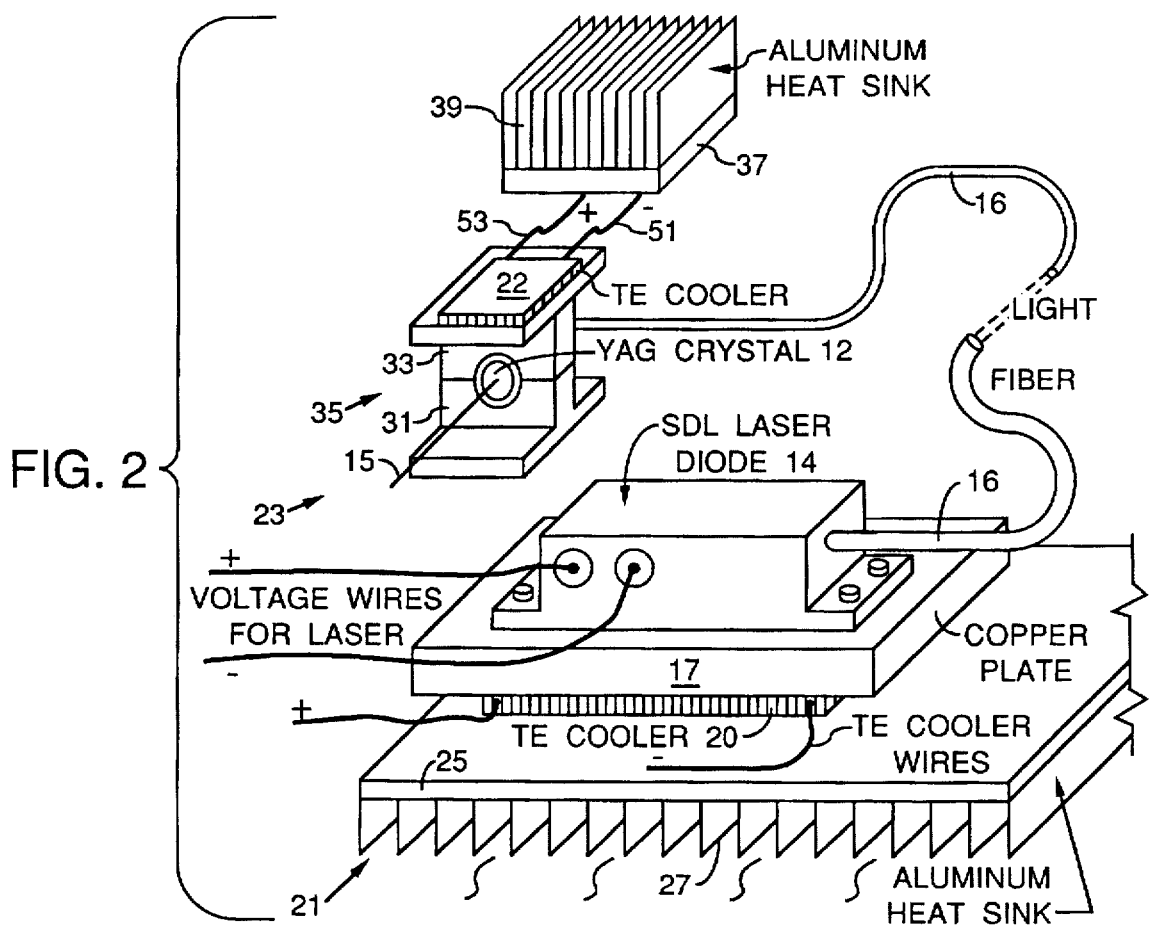
FIG. 2 is a fragmentary perspective schematic view of a first cooling means applied to a laser component and of a second cooling means applied to another laser component of the folded resonator embodiment shown in FIG. 1.

Also as shown in FIGS. 1 and 2, the laser diode 14 is cooled by cooling assembly 21 while the rod crystal 12 is cooled by cooling assembly 23, which cooling assemblies are each powered by a cooling circuit such as shown, e.g. in FIG. 3, as discussed below.

Figure 3:
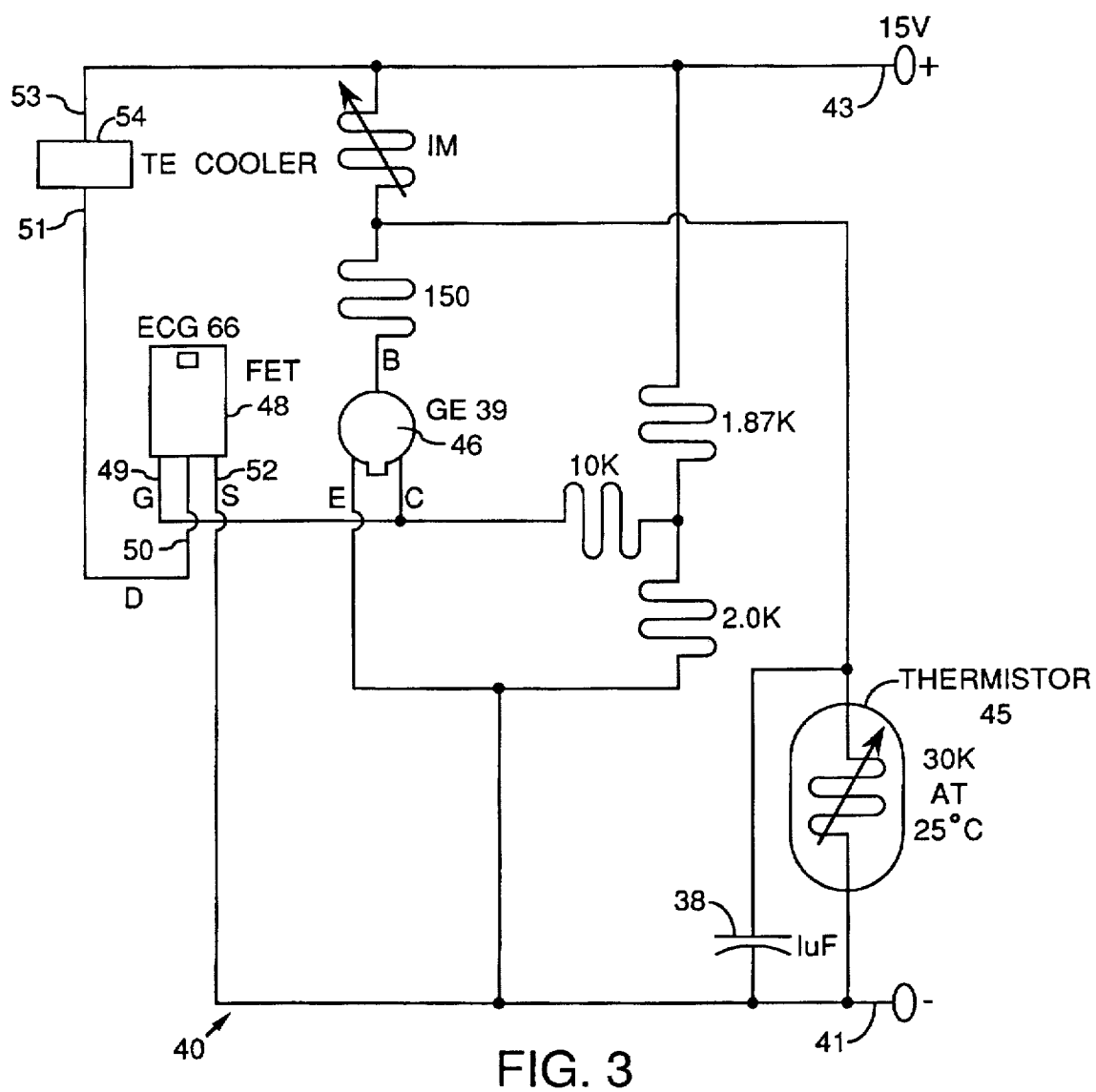
FIG. 3 is a schematic diagram of a thermoelectric temperature control circuit (herein the "cooling circuit") employed in cooling components of the portable laser system of the invention of FIGS. 1 and 2 and FIG. 4 is a perspective schematic view of the portable pump laser system of the invention, e.g. per FIG. 1, in its compact housing.

FIG. 3 shows a cooling circuit 40 having a thermistor 45 whose voltage drop varies with changes in the temperature of the device being measured. The thermistor 45 has a resistance value of 30,000 ohms at room temperature (25° C.). It is mounted to the case of the 15 Watt laser diode. If the temperature of the laser diode (not shown) increases, the resistance of the thermistor 45 decreases (less than 30K ohms) and in turn, reduces the voltage drop to the base of the bipolar transistor 46 (GE39). The decrease in voltage drop to the base of the transistor 46 causes it to cut off, resulting in a larger voltage drop to the gate 49 of the field effect transistor (FET) 48 ((ECG66). The FET 48 in turn, increases its current from the drain 50 to the source 52. This same current flow is through the thermoelectric (TE) cooler 54 causing it to cool, e.g. a laser diode (not shown) back down to 25° C. The result is that the temperature of the device being controlled (in this case a laser diode) will stabilize to the desired value. There are two of these circuits in the laser system of FIG. 1, one for each TE cooler,20 and 22.

Thus, as indicated above, laser diode 14 of FIG. 1 is cooled by a cooling assembly 21, which includes TE cooler 20 while rod crystal 12 is cooled by a cooling assembly 23, which includes TE cooler 22, as shown in FIG. 1.

Cooling assembly 21 is shown in more detail in FIG. 2 wherein laser diode 14 having fiber bundle 16 attached thereto, is mounted on a copper plate 17, mounted in turn on TE cooler 20, which in turn, is mounted on heat sink 25, having radiator fins 27.

The cooling assembly 23 is also shown more fully in FIG. 2 wherein YAG crystal 12, connected to fiber bundle 16 emits laser beam 15. The YAG crystal 12 is mounted between the halves 31 and 33 of a metal "T" block 35 (which halves are in contact with the YAG crystal 12), with a TE cooler 22 mounted on block half 33 and with a metal heat sink 37 mounted on the TE cooler 22, as shown on FIG. 2. The metal heat sink 37 has radiator fins 39 mounted thereon, as shown in FIG. 2.

Thus the above cooling assemblies 21 and 23, electrically air-cool the diode and crystal respectively, by radiation and convection off the respective cooling fins 27 and 39 as shown or indicated in FIGS. 1, 2 and 3. That is, the above cooling elements 21 and 23, in combination with the cooling circuit 40, shown in FIG. 3, cool the laser diode 14 and laser crystal 12 to the desired temperature, e.g. about 25° C., as noted above.

Accordingly, the invention provides a compact, portable system that generates a frequency-doubled, green laser of over 1 watt. This system in conjunction with thermo-electric coolers, is air cooled and requires but one external power supply.

As noted above, a prior art laser system, capable of delivering high power green radiation is the Argon Ion Laser. It is a gas laser that requires a large power supply (220 VAC) and is water cooled. This means that unlike the portable laser of the present invention, the Argon Ion Laser is too heavy to be, e.g. carried aboard a commercial airliner by a passenger such as an Ophthalmologist.

Also it is noted that green laser surgery is favored by Ophthalmologists and other doctors because it is highly suitable for eye surgery with minimum discomfort to patients.

The following example is intended as an illustration of the present invention and should not be construed in limitation thereof.

EXAMPLE I

A prototype of the above laser system was packaged into a volume of less than one cubic foot using off-the-shelf power supplies. No liquid coolant was required; all cooling was accomplished using sold-state (thermoelectric) cooling technology per the circuit shown in FIG. 3. The packaged prototype, in conjunction with thermoelectric coolers was air cooled and required single phase, 115 VAC prime power. No other external connections were required.

The prototype laser had a folded resonator design (V-resonator), and used a single, end-pumped Nd:YAG rod crystal. The pump diode was an "SDL-3550-P5" fiber-coupled diode array, which was butt-coupled to the YAG rod. This was done to simplify the design and to take up less space. An "LMS-7008 Lambda" constant current power supply was used to deliver the 22 amps necessary to drive the SDL fiber-coupled diode. The temperature of the laser diode and the YAG rod was held to approximately 25° C. A novel temperature feedback control loop (per FIG. 3) was designed, which allowed constant monitoring and control of the laser diode temperature.

A "Kepco FAW" 15–10K power supply, capable of delivering 10 amps, was used to drive the TE coolers. One TE cooler (and cooling circuit) was used to cool the SDL diode to about 25° C., and a second TE cooler (and cooling circuit) was used to similarly cool the YAG rod. The frequency doubling crystal used, was a single piece of 3 mm×3 mm×10 mm KTP. The KTP was mounted in a holder which allowed moderate xyz translation, xy tilt and 360° rotation about the resonator (z) axis. The KTP temperature was not monitored or stabilized.

The two power supplies (one for two temperature control circuits and one for the laser diode), a 15 W SDL laser diode with TE cooler, cooling circuit and heat sink, a YAG rod with TE cooler, cooling circuit and heat sink, KTP (SHG) crystal, resonator mirrors and mounts, were all installed in a camera box that was 6.2"×8.8"×26". The laser system's entire packaged weight was approximately 35 lbs.

Figure 4:
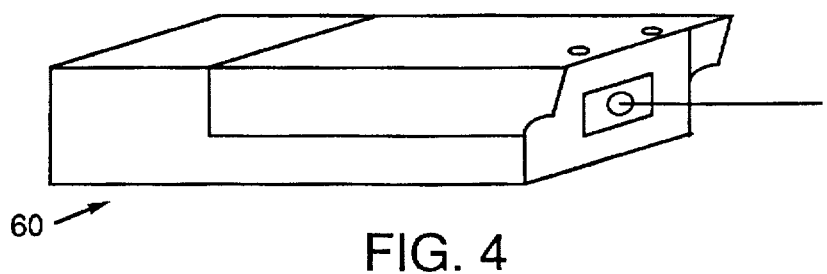

The so boxed laser system is shown in FIG. 4 as portable compact laser 60. Such compact package can be readily carried aboard commercial aircraft by the traveling eye surgeon or visiting professor.

Accordingly the present invention provides a portable, diode pumped, frequency-doubled, solid-state laser that is thermoelectrically air-cooled. The cooling system and power supply are readily contained in a compact "carry-on" case, which system requires only, e.g. 115 VAC power.

Thus the portable, compact laser system of the invention is considerably reduced in size and weight over prior art systems with increased efficiency and reduced cost.

The laser system contained in the package of FIG. 4 is of the folded resonator cavity type e.g. as shown in FIG. 1 hereof.

A high powered laser diode can be employed in the compact laser system of the present invention. A rod crystal of Nd:YAG, Nd:YLF or other rare earth doped crystals, can be employed in the portable laser system of the invention. Suitable lenses can replace the fiber optic cable between the laser diode and the laser crystal, as desired within the scope of the present invention.

The compact laser system of the present invention employs a folded cavity, e.g. as shown in FIG. 1 and can output laser beams of various wavelengths depending on the type of laser crystal employed.

The portable laser system of the present invention can emit laser light in pulsed or CW operation.

As noted above, the laser diode and laser crystal are held to a desired temperature, e.g. about 25° C. by a novel temperature feedback control circuit. The temperature control circuit (FIG. 3), uses bipolar transistors and field effect transistors in conjunction with a power supply to control the drive current to two TE coolers, one for the laser diode and one for the laser crystal.

In the portable laser system of the invention as shown, e.g. in FIG. 1, the input diode pumps e.g. at 10 watts (which output requires an array of diodes though referred to herein as a "diode".) and the laser system outcouples green light at from ½ watt to 1&¼ watts.

The portable laser of the invention with its outcoupling of high power laser light has promising commercial applications in laser surgery, laser radar, materials processing, ophthalmology, dentistry and numerous, other future uses.

What is claimed is:

1. A portable pumped laser system comprising,
   a) a rare earth doped laser rod crystal,
   b) a pump light source to pump said crystal and emit a laser beam,
   c) a thermoelectric circuit to control in air the temperature of a laser component selected from the group consisting of said pump light source and said rod crystal which circuit has a feedback control loop having a TE cooler connected to an electrical switching means and a power supply to adjust the drive current to said TE cooler to control the temperature thereof and that of said laser component and
   d) a folded resonator cavity, said cavity having,
      1) said rod crystal at one end,
      2) a turning mirror spaced therefrom to define the first leg of said resonator cavity and
      3) an end reflector spaced from said turning mirror, to define the second or folded leg of said resonator cavity so as to resonate said laser beam in said first and second legs and to outcouple a portion of said beam through said turning mirror.

2. The laser system of claim 1 wherein said second leg has an SHG crystal therein to increase the frequency of a portion of said laser beam for outcoupling thereof by said turning mirror.

3. The laser system of claim 2 wherein said SHG crystal frequency doubles IR light to green light for outcoupling by said turning mirror.

4. The laser system of claim 1 wherein said rod crystal is a crystal of Nd:YAG.

5. The laser system of claim 1 wherein said pump light source is a laser diode.

6. The laser system of claim 5 having a temperature control circuit for controlling the temperature of a laser component selected from the group consisting of said laser diode and said laser crystal, which circuit has a feedback control loop having a TE cooler connected to an electrical switching means and a power supply to adjust the drive current to said TE cooler to control the temperature thereof and that of said laser component.

7. The laser system of claim 6 wherein said electrical switching means has a bipolar transistor and a field effect transistor connected to each other and connected across said TE cooler.

8. The laser system of claim 6 wherein said temperature control circuit has:
   a) measuring means for monitoring the temperature of said laser component, which means produces an output signal indicative of said temperature,
   b) a switch which produces an actuation signal in response to said output signal and
   c) a TE cooler which is activated by said actuation signal to adjust the temperature of said laser component.

9. The laser system of claim 8 wherein said measuring means is a thermistor.

10. The laser system of claim 8 wherein said switch is at least one transistor.

11. The laser system of claim 8 wherein said switch has at least one field effect transistor and one bipolar transistor.

12. The laser system of claim 1 wherein a fiber-optic cable transmits the light emitted from said laser diode to said rod crystal.

* * * * *